US 8,604,948 B2

(12) United States Patent
Kawasaki

(10) Patent No.: US 8,604,948 B2
(45) Date of Patent: Dec. 10, 2013

(54) PROTECTION CONTROL MONITORING DEVICE

(75) Inventor: Tomoyuki Kawasaki, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 13/362,360

(22) Filed: Jan. 31, 2012

(65) Prior Publication Data

US 2012/0176257 A1    Jul. 12, 2012

Related U.S. Application Data

(63) Continuation of application No. PCT/JP2010/001856, filed on Mar. 16, 2010.

(30) Foreign Application Priority Data

Jul. 31, 2009  (JP) ................................. 2009-178958

(51) Int. Cl.
*H03M 7/30* (2006.01)

(52) U.S. Cl.
USPC ............................................. 341/76; 324/522

(58) Field of Classification Search
USPC ............. 341/76; 324/522, 525; 700/291, 292, 700/293; 702/59, 64
See application file for complete search history.

(56) References Cited

U.S. PATENT DOCUMENTS

2002/0149375 A1 * 10/2002 Hu et al. ....................... 324/522
2009/0172119 A1    7/2009 Eriksson

FOREIGN PATENT DOCUMENTS

| JP | 04-069008 | 3/1992 |
| JP | U 6-086081 | 12/1994 |
| JP | A 8-018458 | 1/1996 |
| JP | A 2009-510968 | 3/2009 |
| WO | WO 2007/040428 A1 | 4/2007 |

OTHER PUBLICATIONS

Jacob Ziv, et al., "A Universal Algorithm for Sequential Data Compression", IEEE Transactions on Information Theory, vol. IT-23, No. 3, May 1977, pp. 337-343.
International Search Report dated Jun. 15, 2010 of PCT/JP2010/001856, filed Jul. 31, 2009 (in English).
Written Opinion of International Searching Authority, PCT/ISA/237 dated Jul. 31, 2009 of PCT/JP2010/001856 filed Jul. 31, 2009.

* cited by examiner

*Primary Examiner* — Joseph Lauture
(74) *Attorney, Agent, or Firm* — Oblon, Spivak, McClelland, Maier & Neustadt, L.L.P.

(57) ABSTRACT

In one embodiment, a protection control monitoring device includes a conversion unit sequentially converting analog data corresponding to an amount of electricity of a power system into digital data and outputting the results as a data sequence, a calculation unit sequentially calculating difference data representing a difference between adjacent data in the data sequence and outputting results as a difference data sequence, a data block generation unit dividing each of a plurality of difference data in the difference data sequence into a plurality of partial data, generating data blocks from a plurality of corresponding partial data, and outputting results as a data block sequence, a compression unit losslessly compressing the data block sequence, and a storage unit storing the losslessly compressed data block sequence.

7 Claims, 3 Drawing Sheets

PROTECTION CONTROL MONITORING DEVICE

CROSS-REFERENCE TO RELATED APPLICATION

This application is a continuation of prior International Application No. PCT/JP2010/001856, filed on Mar. 16, 2010 which is based upon and claims the benefit of priority from Japanese Patent Application No. 2009-178958, filed on Jul. 31, 2009; the entire contents of all of which are incorporated herein by reference.

FIELD

Embodiments described herein relate generally to a protection control monitoring device.

BACKGROUND

A protection control monitoring device takes in an analog input from the outside, converting the analog input into digital data, and thereafter performs various processing to achieve a protection control monitoring function. Further, the protection control monitoring device has a function to store an operating state and data of external inputs when an event occurs, and enables analysis of the states of a power system and a device when an event occurs (see, for example, Reference 1). Accordingly, when the operating state and data of external inputs when an event occurs are stored, it is desired that data used in calculation processing be stored without any change.

When analog input data for a long time are stored, a large number of storage memories are needed. Particularly in a device having a large number of analog input data such as a busbar protective relay device, the necessary capacity increases in proportion to the number of input data. On the other hand, in an incorporated system like the protection control monitoring device, the capacity of the memory for storing data is limited, and there may be a case where storage without any change is impossible.

In such a case, it is generally conceivable to compress the data amount by applying lossless compression. However, in the case of analog input data, fluctuations of values due to random noise exist, and thus there may be cases where compression can be barely performed. Further, by reducing information of random noise through the lossless compression, it is possible to reduce a large amount of data widely. However, in the lossless compression, it is possible that information that is originally needed is reduced besides the random noise, and reproducibility of retained information is lost.

A protection control monitoring device according to one aspect of the embodiments includes a conversion unit sequentially converting analog data corresponding to an amount of electricity of a power system into digital data and outputting the results as a data sequence, a calculation unit sequentially calculating difference data representing a difference between adjacent data in the data sequence and outputting results as a difference data sequence, a data block generation unit dividing each of a plurality of difference data in the difference data sequence into a plurality of partial data, generating data blocks from a plurality of corresponding partial data, and outputting results as a data block sequence, a compression unit losslessly compressing the data block sequence, and a storage unit storing the losslessly compressed data block sequence.

DETAILED DESCRIPTION

Hereinafter, embodiments will be described in detail with reference to the drawings.
(First Embodiment)

Figure 1:
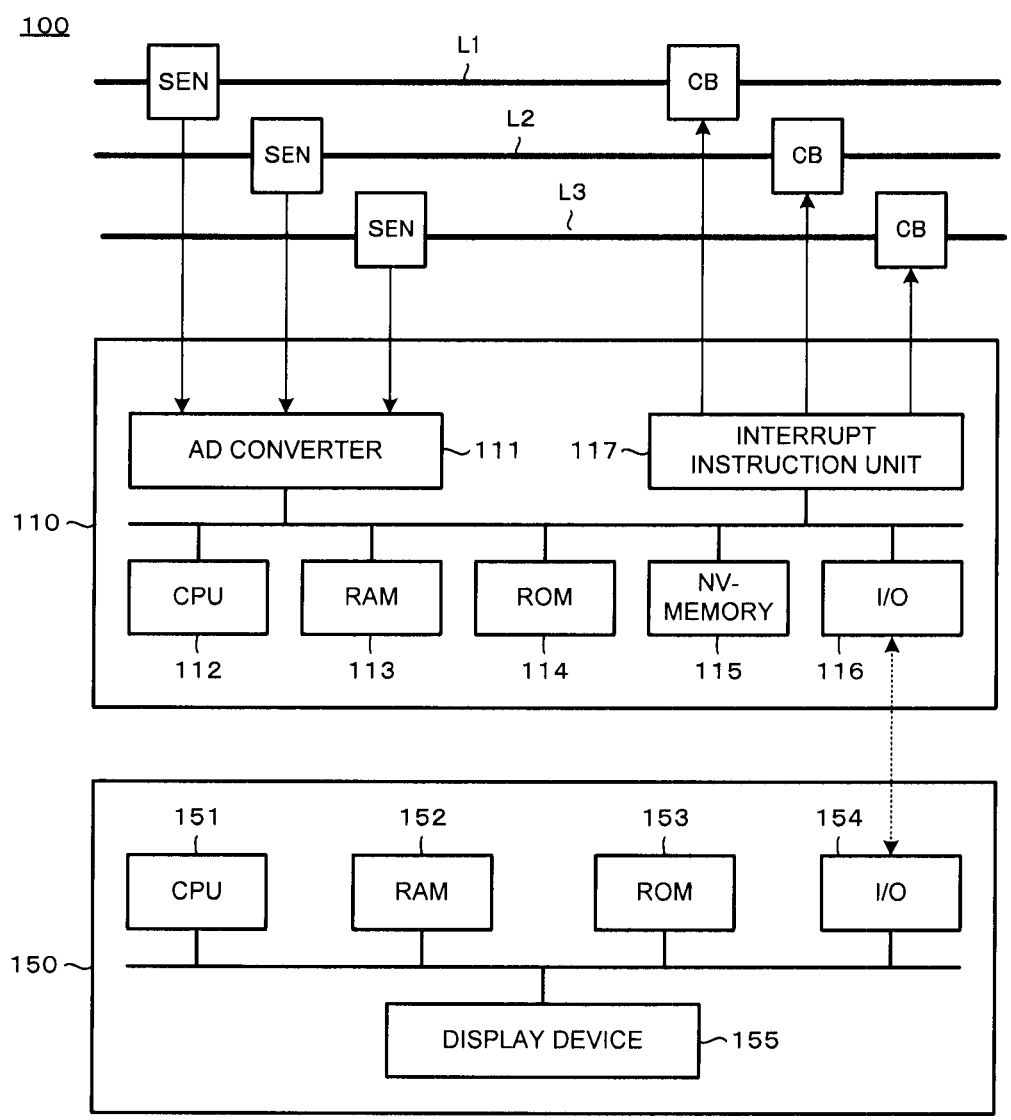
FIG. 1 is a block diagram representing a protection control monitoring device according to one embodiment of the present invention.

FIG. 1 is a block diagram representing a protection control monitoring system 100 according to a first embodiment of the present invention. The protection control monitoring system 100 has a protection control monitoring device (data collecting and recording device) 110 and a data display device 150, and collects and displays information when an event occurs in a power system.

The power system is a system for generating, transforming, transmitting, and distributing electric power for supplying the power to a customer. Here, power transmission lines L1 to L3 as the power system are the target of protection control monitoring by the protection control monitoring system 100.

The occurrence of an event refers to that the target of protection control monitoring (for example, the power transmission lines L1 to L3) deviate from a normal state, and refers to that, for example, the current and voltage of the power transmission lines L1 to L3 deviate from a normal range due to a short circuit or an earth fault (including an earth fault due to lightning strike). For example, when lightning strikes a power transmission line, the voltage of this power transmission line decreases from a normal state, and its current increases from a normal state.

The protection control monitoring device (data collecting and recording device) 110 is connected to a sensor SEN and a circuit breaker CB, performs protection, control and monitoring of the power system (here, the power transmission lines L1 to L3), and accumulates data of the power system at the time of occurrence of an event. An example of the protection control monitoring device 110 is a protective relay (protective electric relay). The protective relay detects a short circuit and a ground fault (lightning strike) which occurred in the power system, and transmits a control signal to the circuit breaker to select the failed section and quickly separate it from the power system, so as to suppress spreading of the influence thereof.

The protection control monitoring device 110 has an AD converter 111, a CPU 112, a RAM 113, a ROM 114, an NV memory 115, an I/O 116, and an interrupt instruction unit 117.

The AD (Analog-Digital) converter 111 receives inputs of an amount of system electricity (analog data) from the sensor SEN in chronological order, analog-digital converts them into digital data of a fixed bit number (for example, 16 bits), and outputs them as a data sequence. The amount of system electricity is an analog amount representing a state of the power system, and includes the current and voltage of the power transmission lines L1 to L3. Thus, the AD converter 111 functions as a conversion unit sequentially converting analog data corresponding to an amount of electricity of a power system into digital data and outputting the results as a data sequence.

In addition, the amounts of system electricity of different types at different points of measurement are AD converted separately from each other in principle. This is the same in difference processing, bit slice processing, and compression processing, which will be described later.

The CPU (Central Processing Unit) 112 performs various processing as follows according to a program stored in the ROM 114.

(1) Calculation of the Amplitude Value of an Amount of System Electricity

Since the data sequence represents the amount of system electricity (for example, the current and voltage of the power transmission lines L1 to L3) and hence represents a chronological change by a sinusoidal wave at a predetermined frequency (for example, 50 Hz or 60 Hz). Thus, by adding up the data sequence over one cycle of the sinusoidal wave or apart thereof (for example, ¼ cycle), the amplitude value (amplitude of the sinusoidal wave) of the amount of system electricity can be calculated. Further, prior to this calculation of amplitude value, variations over time of the data sequence are smoothed by digital filter processing, and noise is removed. Thus, the CPU 112 functions as a calculation unit calculating the amplitude value of the data sequence (for example, an amount of system electricity such as current and voltage).

(2) Detection of an Event (Relay Operation Judgment)

The CPU 112 detects occurrence of an event in the power system (for example, the power transmission lines L1 to L3). For example, occurrence of an event is detected based on that the amplitude value of the amount of system electricity exceeds a predetermined value. When an event is detected, issue of a trip instruction to the circuit breaker CB, storage of data of the amount of system electricity in the NV memory 115, and so on are performed.

However, it is unnecessary to uniformly execute both the issue of a trip instruction and the storage of data. That is, respective conditions of the issue of a trip instruction and the storage of data can be different from each other. For example, it is conceivable to store data when the amplitude value of the amount of system electricity exceeds a first value, and to issue a trip instruction when the amplitude value of the amount of system electricity exceeds a second value larger than the first value.

(3) Relay Operation

When an event occurs, the CPU 112 issues a trip instruction to the interrupt instruction unit 117 to make the circuit breaker CB operate, so as to electrically disconnect the power transmission lines L1 to L3 (relay operation). As a result, power transmission via the power transmission lines L1 to L3 in which an event such as a lightning strike has occurred is stopped.

(4) Storage of Data of the Amount of System Electricity

When an event occurs, the CPU 112 stores data of the amount of system electricity in the NV memory 115. Prior to this storage of data, preprocessing (difference processing and bit slice processing) and data compression processing are executed. By performing the preprocessing prior to the data compression processing, compression efficiency of data increases, and both reproducibility of information and reduction in amount of information to be stored are achieved.

The CPU 112 functions as follows. Note that details of this will be described later.

a calculation unit sequentially calculating difference data representing a difference between adjacent data in the data sequence and outputting results as a difference data sequence, a data block generation unit dividing each of a plurality of difference data in the difference data sequence into a plurality of partial data, generating data blocks from a plurality of corresponding partial data, and outputting results as a data block sequence, and a compression unit losslessly compressing the data block sequence.

The RAM (Random Access Memory) 113 stores data of calculation results and data in middle of calculation in the CPU 112.

The ROM (Read Only Memory) 114 stores a program causing the CPU 112 to operate.

The NV (non-volatile) memory 115 stores analog input data used for judging relay operation before or after an operation, or the like in a manner that the information can be retained even when the power of the apparatus is cut off.

The I/O (Input/Output) 116 is an input/output interface for inputting/outputting data to/from the outside (an external device or a unit inside the device). The I/O 116 outputs data stored in the NV memory 115 to the data display device 150.

The interrupt instruction unit 117 turns ON/OFF the circuit breaker CB upon instruction from the CPU 112.

The data display device 150 receives inputs of data stored in the NV memory 115 from the protection control monitoring device 110, and analyze and display them.

The data display device 150 has a CPU 151, a RAM 152, a ROM 153, an I/O 154, and a display device 155.

The CPU (Central Processing Unit) 151 performs reconstruction of data (expansion processing, bit slice reverse processing, and sum processing of data), analysis processing of data, and displaying on the display device 155 according to the program stored in the ROM 153. Note that details of the reconstruction of data will be described later.

The RAM (Random Access Memory) 152 stores data of calculation results and data in middle of calculation in the CPU 151.

The ROM (Read Only Memory) 153 stores a program causing the CPU 151 to operate.

The I/O 154 is an input/output interface for inputting/outputting data to/from the outside (an external device or a unit inside the device). The display device 155 is a device, for example a liquid crystal display device, displaying analysis results.

(Details of the Storage of Amount Data of System Electricity)

A. Necessity of Data Compression

If the capacity of the NV memory 115 included in the protection control monitoring device 110 is sufficient for data analysis, the analog input data can be stored without any change. However, when an operation time becomes long or it is applied in a model having a large number of analog inputs, the data amount to be stored can exceed the capacity of the NV memory 115, and it can be difficult to store the data without any change. For example, when the protection control monitoring device 110 attempts to record current and voltage waveforms when an event occurs, the capacity M needed for recording is as following equation (1).

$$M = Va * Vb * Vc * Vd \qquad \text{equation (1)}$$

Va: the number of data per second
Vb: storage time
Vc: the number of data to be stored
Vd: the number of times of storage Here, when Va=2880 B (byte), Vb=3.3 seconds, Vc=204, and Vd=1, the result is M=1.8 MB, which means, when the capacity of the NV memory 115 is 1 MB, it is not possible to store even the data corresponding to one time of event.

Thus, when the capacity needed for recording and the capacity of the NV memory 115 do not correspond, it is generally conceivable to compress the data amount by applying lossless compression. However, in the case of analog input data, fluctuations of values due to random noise exist, and thus there may be cases where compression can be barely performed. By reducing information of random noise through the lossless compression, it is possible to reduce a large amount of data widely. However, in the lossless compression, it is possible that information that is originally needed is reduced besides the random noise, and reproducibility of retained information is lost.

B. An Approach of Data Compression

Here, utilizing the fact that the analog inputs to the protection control monitoring device 110 are mainly constituted of sinusoidal waves corresponding to the system frequency, information density can be changed by combining difference processing and bit slice processing as preprocessing of the lossless compression, so as to improve the data compression efficiency. Details of this will be described below.

(1) Difference Processing

Main components of the analog inputs to the protection control monitoring device 110 are sinusoidal waves corresponding to the system frequency, and a variation of data between adjacent sampling data is small compared to the range of data which can be represented. By taking a difference, reduction of the effective bit length can be expected. A specific example in the case where the analog input is a single sinusoidal wave is presented.

The latest sampling data X(n) and the immediately preceding sampling data X(n−1) are represented as following equation (2)

$$X(n) = A^* \sin(\omega n + \theta)$$

$$X(n-1) = A^* \sin(\omega(n-1) + \theta) \quad \text{equation (2)}$$

A: amplitude value, ω: sampling angle, θ: phase, n: sampling number

Taking a difference between the latest sampling data X(n) and the immediately preceding sampling data X(n−1) is as following equation (3).

$$X(n) - X(n-1) = A*\sin(\omega n + \theta) - A*\sin(\omega(n-1) + \theta) \quad \text{equation (3)}$$
$$= 2A*\sin(\omega/2)*\cos(\omega n + \theta + \omega/2)$$

The ratio R between an amplitude value A1 after taking a difference and an amplitude value A before taking a difference is represented by following equation (4).

$$R = A1/A \quad \text{equation (4)}$$
$$= 2A*\sin(\omega/2)/A$$
$$= 2\sin(\omega/2)$$
$$\approx \omega$$

(When ω is sufficiently small, an approximation sin (ω)=ω holds)

By this equation (4), it can be seen that the amplitude A1 (ratio R of amplitude values) after taking a difference becomes small according to the sampling angle ω. The amplitude value A1 of a difference of data with the sampling angle ω of π/48 becomes the magnitude of about 1/15 compared to the amplitude value A before taking a difference. This indicates that there is only information representing a code in high order bits after taking a difference. Thus, a large data change is retained in the high order bits of difference data, and a smaller data change appears in lower order bits. That is, data of high order bits are relatively low in information density. Therefore, as will be described later, by dividing the difference data in units of several bits and collecting parts of high order bits, highly efficient compression with a general compression algorithm becomes possible.

The sampling data (waveform data) are, for example, 16-bit binary data. As already described, the sampling data have a rough pattern in which small noise overlaps with a sinusoidal wave. That is, the sampling data include a part representing a rough characteristic of a sinusoidal wave and a part representing a small structure of data. By taking a difference of the sampling data, the part representing a rough characteristic and the part representing a small structure can be separated more clearly. That is, a high order part and a low order part of the difference data correspond more clearly to the part representing a rough characteristic of a sinusoidal wave and a part representing a small structure of data, respectively.

It is not always necessary to take the difference with immediately preceding sampling data. However, as illustrated by equation (4), taking the difference with immediately preceding sampling data makes the amplitude value tend to be small. When the frequency of the amount of system electricity and the sampling timing in the device correspond completely, taking a difference of data preceding at 360 degrees of electrical angle or taking a sum with data preceding at 180 degrees logically results in zero, and the amount of information becomes minimum. However, in practice, the frequency of the amount of system electricity and the sampling timing in the device do not correspond, and the system frequency fluctuates depending on the system state. Accordingly, taking the difference with immediately preceding sampling data enables more reliable data compression.

(2) Bit Slice Processing

By collecting high order parts of difference data (bit slice processing), the continuity of the same pattern (0, 1) is increased, and more efficient compression becomes possible.

Figure 2:
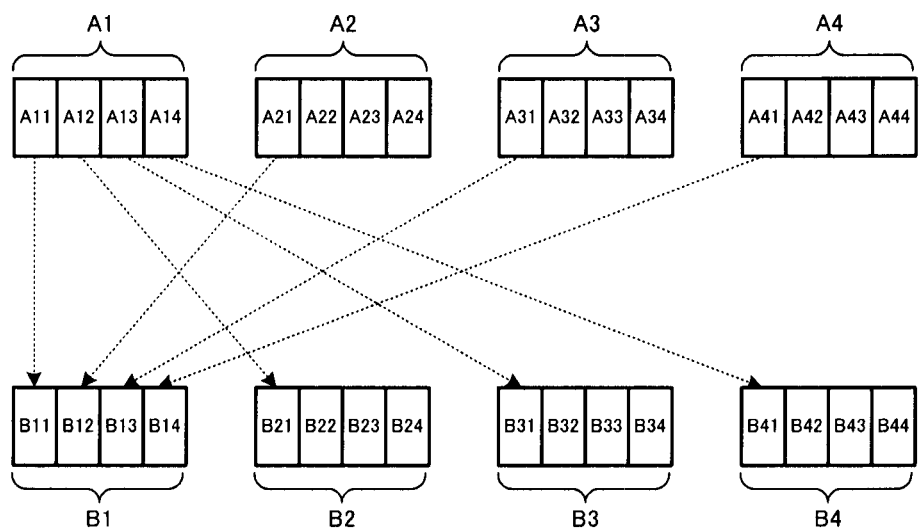
FIG. 2 is a schematic diagram representing an example of bit slice processing.

FIG. 2 is a schematic diagram representing an example of bit slice processing.

In this example, 16-bit data block sequences B1 to B4 are generated from 16-bit data sequences A1 to A4 which are sequential. Each of the data sequences A1 to A4 is difference data of sampling data of the amount of system electricity.

The data sequences A1 to A4 are each divided into four 4-bit partial data sequences A11 to A14, A21 to A24, A31 to A34, A41 to A44, respectively. The partial data sequences A11 to A41 of four high order bits of the respective data sequences A1 to A4 are combined and reconstructed to one 16-bit data block B1. Similarly, the partial data sequences A12 to A42 of medium high order, the partial data sequences A13 to A43 of medium low order, and the partial data sequences A14 to A44 of low order are reconstructed as the 16-bit data blocks B2 to B4. By this processing, reconstruction to the four large blocks B1 to B4 which differ in information density is possible without changing the overall data.

The data length of the data sequence may not be 16-bit, and the number of divisions may not be four. For example, when the number of divisions is set to eight, the data blocks are reconstructed by every eight samplings with partial data sequences in units of two bits, which are reconstructed into eight data blocks which differ in information density. Moreover, the units of divisions are not necessary to be even, and for example, 16-bit data may be divided into four, four, and eight from the high order bits.

Thus, by adding preprocessing (difference processing and bit slice processing) prior to compression processing, highly versatile compression processing is possible without modifying the compression algorithm itself.

(3) Compression Processing

The Deflate method (one type of lossless compression processing) having versatility can be used as a compression algorithm after the difference processing and the bit slice processing. This method is to encode an overlapping pattern by run-length coding represented by the LZ77 algorithm, or the like, and encode the encoded data with Huffman codes.

For a data sequence in which 0 or 1 continues, significant compression efficiency can be expected in coding of a data pattern. The block of high order data after the difference processing and the bit slice processing are performed mostly has code information, and consequently tends to become a data sequence in which 0 or 1 continues. Therefore, they are data suitable for the run-length coding, and hence high compression efficiency is possible.

Here, data of the low order bits after the difference processing and the bit slice processing are performed are largely affected by random data, and thus data compression is scarcely expected when data compression is performed. Accordingly, to reduce the calculation processing amount and the capacity of the RAM 113 used for calculation, it is conceivable that compression processing is not performed for the data block of low order bits after the difference processing and the bit slice processing are performed.

Specifically, it is conceivable to losslessly compress the data blocks B1 to B3, and not to compress the data block B4. Further, it is also conceivable to losslessly compress the data blocks B1, B2 and not to compress the data blocks B3, B4. Furthermore, it is conceivable to losslessly compress only the data block B1 and not to compress the data blocks B2 to B4. In general, the higher the data block is, the easier it becomes a data sequence in which 0 or 1 continues and the higher the compression efficiency.

A reference related to compression algorithm: "A Universal Algorithm for Sequential Data Compression", JACOB ZIV, FELLOW, IEEE, AND ABRAHAM LEMPEL, MEMBER, IEEE, IEEE TRANSACTIONS ON INFORMATION THEORY, VOL. IT-23, No. 3, MAY 1977, PP 337-343.

(4) Passing/Receiving and Restoring Data

The compressed data themselves stored in the NV memory 115 can be passed to the data display device 150, and can be expanded on the data display device 150 side. The compressed data can also be expanded and restored to the original data in the protection control monitoring device 110, and then passed to the data display device 150.

The restoration of data can be performed by executing expansion processing, bit slice reverse processing, and sum processing of data in this order.

The expansion processing of data is reverse processing of the compression processing of data. By expansion processing the compressed data, the data before being compressed are restored.

Figure 3:
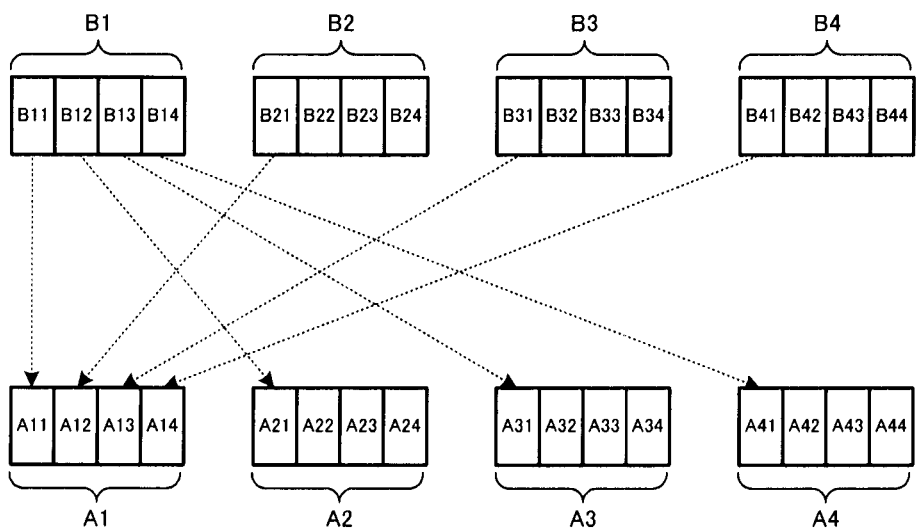
FIG. 3 is a schematic diagram representing an example of bit slice reverse processing.

The bit slice reverse processing is reverse processing of the bit slice processing. As illustrated in FIG. 3, by subjecting the bit-slice processed block data B1 to B4 to the bit slice processing again, the original data sequences A1 to A4 are restored. That is, in this example, the bit slice reverse processing is the bit slice processing as it is.

The sum processing is processing to calculate a sum between adjacent block data, and is reverse processing of the difference processing.

By the compression processing, the bit slice reverse processing, and the sum processing as described above, the sampling data (data of the amount of system electricity) can be reproduced.

(Operation of the Protection Control Monitoring System 100)

Operation of the protection control monitoring system 100 will be described.

Figure 4:
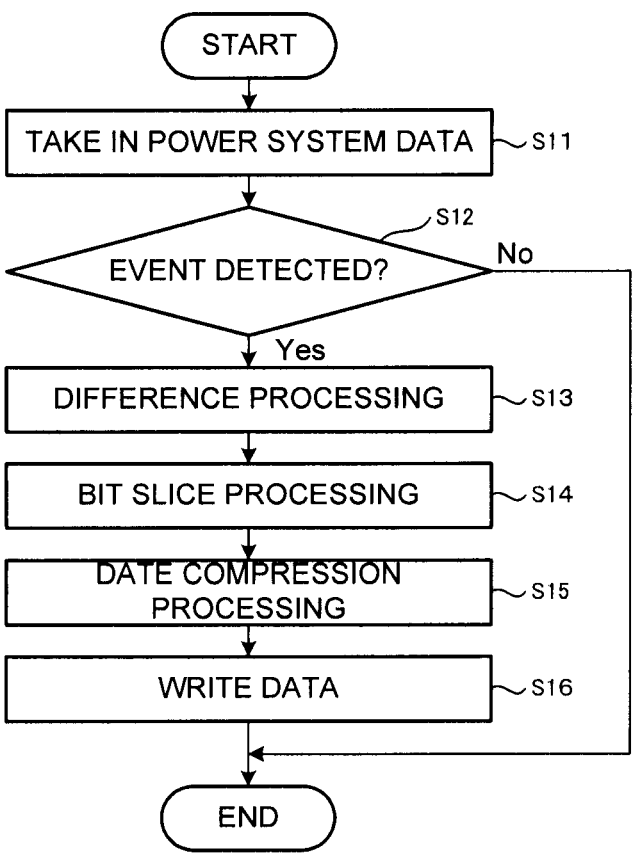
FIG. 4 is a flowchart representing an operating procedure of the protection control monitoring device.
Figure 5:
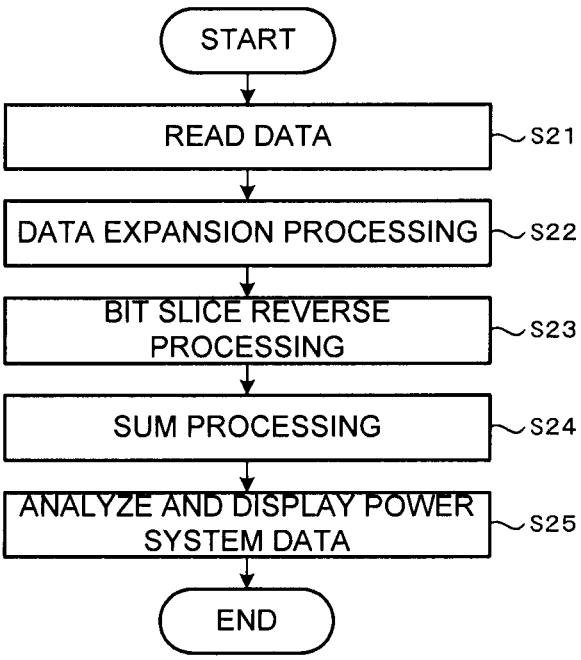
FIG. 5 is a flowchart representing an operating procedure of a data display device.

FIG. 4 and FIG. 5 are flowcharts representing operating procedures of the protection control monitoring device 110 and the data display device 150, respectively.

A. Operation of the Protection Control Monitoring Device 110

(1) Taking in Power System Data (Step S11)

Data of the amount of system electricity from the sensor SEN are sequentially taken into the AD converter 111, and AD converted, thereby generating a data sequence representing a chronological change of the amount of system electricity. As already described, the amounts of system electricity of different types at different points of measurement are AD converted separately from each other.

(2) Detection of an Event (Step S12)

The CPU 112 detects a change in event. That is, the amplitude value of the amount of system electricity is compared with a predetermined reference value, and when the amplitude value is larger than the reference value, it is judged that an event has occurred. As illustrated next, corresponding to occurrence of the event, data of the amount of system electricity are written in the NV memory 115. Prior to this writing, the difference processing, the bit slice processing, and the data compression processing are executed on the data of the amount of system electricity.

(3) Difference Processing (Step S13)

A difference in data sequence of adjacent amounts of system electricity is calculated, and a difference data sequence is generated.

(4) Bit Slice Processing (Step S14)

The bit slice processing is executed on the difference data sequence. That is, each difference data sequence is divided into a plurality of partial data (bits) and rearranged (synthesized), to thereby generate data block sequences.

(5) Data Compression Processing/Writing (Steps S15, S16)

The lossless compression processing is executed on the generated data block sequences, which are then written in the NV memory 115.

B. Operation of the Data Display Device 150

(1) Reading Data (step S21)

The data display device 150 reads out the data block sequences written in the NV memory 115 via the I/O 116, 154.

(2) Data Expansion Processing (Step S22)

The CPU 151 reproduces the data block sequences before the lossless compression processing by expansion processing the read data block sequences.

(3) Bit Slice Reverse Processing (Step S23)

The CPU 151 performs bit slice reverse processing on the expansion processed data block sequences, to thereby reproduce the difference data sequences. That is, each of the data block sequences is divided into a plurality of partial data (bits) and rearranged (synthesized), thereby reproducing the difference data sequences.

(4) Sum Processing (Step S24)

The CPU 151 calculates the sum of adjacent data block sequences in the expansion processed data block sequences, to thereby reproduce the data sequence (power system data) representing a chronological change of the amount of system electricity.

(5) Analysis and Display of Power System Data (Step S25)

The CPU 151 analyzes the reproduced power system data and displays an analysis result thereof on the display device 155.

As described above, compression efficiency is improved by adding preprocessing (difference processing and bit slice processing) to the lossless compression processing for data for which data compression has been difficult by only the lossless compression processing.

As a result, without changing the capacity of the NV memory 115 itself, information for an amount of time which has been conventionally impossible to store can be stored in the NV memory 115. Further, even when data for a long time are not necessary, the data size to be stored per one time can be reduced, and the number of times of recording can be increased. By increasing the number of times of recording, it becomes possible to retain data related to all events even when plural events to be recorded occur in a short period, and operation analysis of the device and verification of the operating state of the system can be performed easily.

(Second Embodiment)

When the S/N ratio of data is not good (for example, when there is no analog input), there is a small amount of data of sinusoidal wave according to the system frequency, and thus it basically becomes a random data sequence in the vicinity of zero. In the case of such input data, taking a difference results in spreading of the distribution of data, which leads to a drop of data compression efficiency. To prevent this, the magnitude of analog input data (amplitude value) at the time the device operates or at the time the output data of components of the protection control monitoring device 110 change is obtained, and the difference processing and the bit slice processing are omitted when the magnitude is equal to or smaller than a constant value (predetermined value), to thereby prevent deterioration in compression efficiency.

Concretely, when the amplitude value of data sequence calculated by the CPU 112 is equal to or smaller than a predetermined value, the CPU 112 performs control as follows. Specifically, the CPU 112 losslessly compresses this data sequence, and stores the losslessly compressed data sequence in the NV memory 115.

(Third Embodiment)

Occurrence of an event and performing preprocessing or not can be correlated.

There are cases where occurrence of an event (system failure) and data are in correspondence. For example, a lightning strike causes the current to increase and the voltage to decrease. Accordingly, in correspondence with occurrence of an event, it is switched from not performing preprocessing to performing preprocessing for current, and from performing preprocessing to not performing preprocessing for voltage.

There are many cases where operation of the protection control monitoring device 110 causes the analog input to be in non-input state. Thus, it is possible to increase efficiency of data compression by switching between applying the lossless compression as it is and applying the preprocessing before and after operation of the device.

Specifically, the CPU 112 performs processing as follows.
Dividing a data sequence into a plurality of partial data sequences.
Calculating an amplitude value of each of the plurality of partial data sequences.
Losslessly compressing the partial data sequences when the calculated amplitude value is equal to or smaller than a predetermined value, and causing the NV memory 115 to store the losslessly compressed partial data sequences.

In this manner, it is easy to switch between applying the lossless compression and applying the preprocessing separately for each of current and voltage.

(Fourth Embodiment)

To handle special analog input data for which the difference processing and the bit slice processing result in spreading of the overall data distribution thereof, processing of data for which the lossless compression processing is performed after performing the difference processing and the bit slice processing and processing of data for which only the lossless compression processing is simply performed are executed simultaneously, and the data consequently having a smaller data amount is selected, thereby achieving compression of data even for inputs for which the difference processing and the bit slice processing are not suitable.

Specifically, the CPU 112 performs processing as follows.
Losslessly compressing a difference data sequence after preprocessing (being preprocessed).
Losslessly compressing a difference data sequence before preprocessing (not being preprocessed).
Comparing results of the lossless compression before and after the preprocessing.
Losslessly compressing the difference data sequence either before or after preprocessing based on the result of this comparison, and causing the NV memory 115 to store the losslessly compressed partial data sequence.

(Fifth Embodiment)

This embodiment is to handle the case where the amount of information increases due to needless rising of 1 at a bit other than the high order bit representing a code when the result of taking a difference between adjacent data is negative. When a sinusoidal wave is assumed as the analog input, the amplitude value is compressed to $2\sin(\omega/2)$ by taking a difference, but all the bits higher than the compressed information length change according to the code. The amount of one bit will suffice as code information, and this amount becomes redundant information.

For example, when 2 and $-2$ are represented in 8-bit data by the two's complement which is general numeric representation, they are [00000010] and [11111110], respectively, but when represented by a code and an absolute value, they are [0]+[000010], [1]+[000010], which only differ in code information. When the input data are only constituted of sinusoidal waves, as illustrated in the first embodiment, the difference between sampling data is $2A*\sin(\omega/2)\cos(\omega n+\theta+\omega/2)$ where $\omega$ is a constant representing a sampling angle and hence it is a sinusoidal wave. That is, they are data symmetrical in positive and negative sides of an origin, and thus it is possible to reduce information by using the representation of code bit (one bit data representing a code of difference data)+absolute value data (plural bit data representing an absolute value of difference data) as illustrated in the example of 2 and $-2$.

In this case, in the bit slice processing, preferably, the code bit and the absolute value data are separated into different partial data sequences. Specifically, the difference data are divided into a partial data sequence having only a code bit and one or more partial data sequences corresponding to absolute value data, and a data block is generated from a plurality of corresponding partial data.

(Other Embodiments)

Embodiments of the present invention are not limited to the above-described embodiments and can be expanded and modified, and expanded or modified embodiments are included in the technical scope of the present invention. In the above-described embodiments, the system data are stored corresponding to occurrence of an event, but the system data may also be stored constantly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protection control monitoring device, comprising:
   a conversion unit sequentially converting analog data corresponding to an amount of electricity of a power system into digital data and outputting the results as a data sequence;
   a calculation unit sequentially calculating difference data representing a difference between adjacent data in the data sequence and outputting results as a difference data sequence;
   a data block generation unit dividing each of a plurality of difference data in the difference data sequence into a plurality of partial data, generating data blocks from a plurality of corresponding partial data, and outputting results as a data block sequence;
   a compression unit losslessly compressing the data block sequence; and
   a storage unit storing the losslessly compressed data block sequence.

2. The protection control monitoring device according to claim 1,
   wherein the storage unit stores one or more data blocks corresponding to one or more partial data of low order bits in the plurality of partial data without losslessly compressing the data blocks.

3. The protection control monitoring device according to claim 1, further comprising:
   a second calculation unit calculating an amplitude value of the data sequence; and
   a control unit causing the compression unit to losslessly compress the data sequence when the calculated amplitude value is equal to or smaller than a predetermined value, and causing the storage unit to store the losslessly compressed data sequence.

4. The protection control monitoring device according to claim 1, further comprising:
   a division unit dividing the data sequence into a plurality of partial data sequences;
   a third calculation unit calculating an amplitude value of each of the plurality of partial data sequences; and
   a control unit causing the compression unit to losslessly compress the partial data sequences when the calculated amplitude value is equal to or smaller than a predetermined value, and causing the storage unit to store the losslessly compressed partial data sequences.

5. The protection control monitoring device according to claim 1, further comprising:
   a second compression unit losslessly compressing the difference data sequence; and
   a comparison unit comparing results of lossless conversion in the first and the second compression unit,
   wherein the storage unit stores either the losslessly compressed data block sequence or the losslessly compressed data sequence based on the result of comparison.

6. The protection control monitoring device according to claim 1,
   wherein the difference data are separated into one bit data representing a code of the difference data and plural bit data representing an absolute value of the difference data.

7. The protection control monitoring device according to claim 1,
   wherein the compression unit losslessly compresses the data block sequence based on the Deflate algorithm.

* * * * *